United States Patent
Lin et al.

(10) Patent No.: US 10,564,768 B2
(45) Date of Patent: Feb. 18, 2020

(54) TOUCH PANELS AND METHODS OF EXAMINING TOUCH PANELS

(71) Applicant: Acer Incorporated, New Taipei (TW)

(72) Inventors: Jia-Yu Lin, New Taipei (TW); Chih-Chiang Chen, New Taipei (TW)

(73) Assignee: ACER INCORPORATED, New Taipei (TW)

(*) Notice: Subject to any disclaimer, the term of this patent is extended or adjusted under 35 U.S.C. 154(b) by 45 days.

(21) Appl. No.: 15/920,902

(22) Filed: Mar. 14, 2018

(65) Prior Publication Data

US 2019/0056833 A1    Feb. 21, 2019

(30) Foreign Application Priority Data

Aug. 17, 2017   (TW) .............................. 106127928 A

(51) Int. Cl.
*G06F 3/041*    (2006.01)
*G06F 3/044*    (2006.01)

(52) U.S. Cl.
CPC .......... *G06F 3/0416* (2013.01); *G06F 3/0418* (2013.01); *G06F 3/044* (2013.01); *G06F 2203/04107* (2013.01)

(58) Field of Classification Search
CPC .. G06F 11/2221; G06F 3/0416; G06F 3/0418; G06F 2203/04107; G06F 3/044
See application file for complete search history.

(56) References Cited

U.S. PATENT DOCUMENTS

| 2011/0073384 | A1* | 3/2011 | Osoinach | G06F 3/0416 178/18.06 |
| 2016/0156177 | A1* | 6/2016 | Lin | G06F 3/041 345/173 |
| 2016/0378264 | A1* | 12/2016 | Shih | G06F 3/0418 345/174 |
| 2018/0011562 | A1* | 1/2018 | Wu | G06F 3/041 |

* cited by examiner

*Primary Examiner* — Stacy Khoo
(74) *Attorney, Agent, or Firm* — McClure, Qualey & Rodack, LLP

(57) ABSTRACT

The present invention provides a touch panel, including a touch-sensing circuit, an ESD protection circuit, and a processor. The touch-sensing circuit is composed of a plurality of sensing pads for sensing at least one touching object and outputting a sensing signal. The ESD protection circuit is connected to the touch-sensing circuit, surrounds the touch sensing circuit, and generates a circuit-loading. The processor is coupled to the touch sensing circuit and the ESD protection circuit to receive the sensing signal and the circuit-loading, performs an action according to the sensing signal, and determines whether to generate a warning signal according to a circuit-load change.

8 Claims, 5 Drawing Sheets

TOUCH PANELS AND METHODS OF EXAMINING TOUCH PANELS

CROSS REFERENCE TO RELATED APPLICATIONS

This Application claims priority of Taiwan Patent Application No. 106127928, filed on Aug. 17, 2017, the entirety of which is incorporated by reference herein.

BACKGROUND OF THE INVENTION

Field of the Invention

The present invention relates to a touch panel and a method of examining the touch panel, and more particularly, to a touch panel and a method of examining the touch panel to determine health of the touch panel according to a load change on the ESD protection circuit.

Description of the Related Art

In recent years, as touch products have rapidly developed, electronic devices having touch functionality have become common in daily life. However, although different examination procedures have been arranged according to the different assembly sequences in the process of manufacturing the touch panels, there are still some reasons for which certain faults in a touch panel cannot be tested for, and that may result in defective products being sold on the market. Therefore, how to determine whether the touch panel is abnormal after it is manufactured is a problem that needs to be solved immediately.

BRIEF SUMMARY OF INVENTION

An embodiment of the present invention provides a touch panel, including a touch-sensing circuit, an ESD protection circuit and a processor. The touch-sensing circuit consists of a plurality of sensing pads for sensing at least one touching object, and is configured to output a sensing signal. The ESD protection circuit connects to the touch-sensing circuit, surrounds the touch-sensing circuit and generates a circuit-load. The processor couples with the touch-sensing circuit and the ESD protection circuit for receiving the sensing signal and the circuit-load, performs an action according to the sensing signal, and determines whether to generate a warning signal according to a circuit-load change.

Another embodiment of the present invention provides a method of examining a touch panel, the steps of which are as follows. A touch-sensing circuit senses at least one touching object to output a sensing signal, wherein the touch-sensing circuit consists of a plurality of sensing pads; a processor performs an action according to the sensing signal; the processor receives a circuit-load of an ESD protection circuit, wherein the ESD protection circuit is connected to the touch-sensing circuit and surrounds the touch-sensing circuit; and the processor determines whether to generate a warning signal according to a circuit-load change.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present touch panels and methods of examining touch panels can be applied will become apparent from the detailed description provided herein. It should be understood that the detailed description and specific examples, while indicating exemplary embodiments of touch panels and methods of examining touch panels, are intended for the purposes of illustration only and are not intended to limit the scope of the invention.

Figure 1:
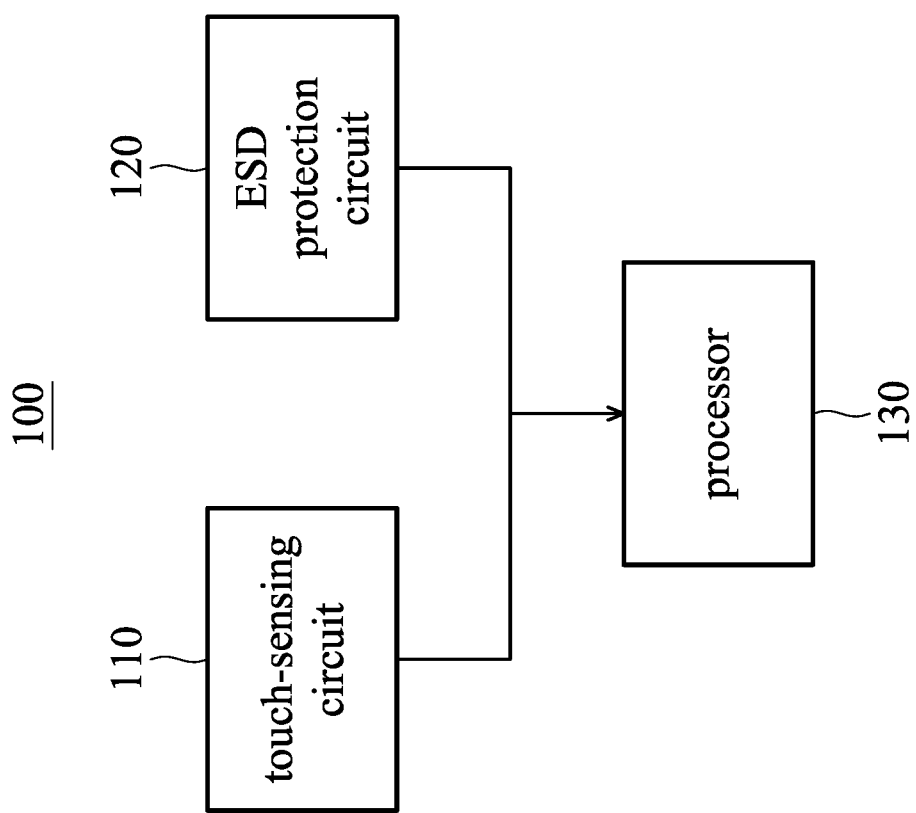
FIG. 1 is a block diagram of a touch panel in accordance with an embodiment of the present invention.

FIG. 1 is a block diagram of a touch panel 100 in accordance with an embodiment of the present invention. The touch panel 100 includes a touch-sensing circuit 110, an ESD (ElectroStatic Discharge) protection circuit 120 and a processor 130. The touch-sensing circuit 110 includes a plurality of first sensing series and a plurality of second sensing series. The first sensing series consists of a plurality of first sensing pads extending in a first direction, and each of the first sensing series is electrically isolated from each other. The second sensing series consists of a plurality of second sensing pads extending in a second direction perpendicular to the first direction, and each of the second sensing series is electrically isolated from each other. When the touch-sensing circuit 110 detects a touch action of at least one touch object, the touch-sensing circuit 110 generates a corresponding sensing signal. The ESD protection circuit 120 connects to the touch-sensing circuit 110 and surrounds the touch-sensing circuit 110 to provide a current path for ESD to prevent current from flowing into the touch-sensing circuit 110. In addition, the ESD protection circuit 120 further generates a circuit-load. The circuit-load is an RC load or only a resistance value. When the ESD protection circuit 120 generates the circuit-load, an analog signal of the circuit-load will be converted to a digital signal by an analog-to-digital conversion, and then transmitted to the processor 130 for processing. While performing the analog-to-digital conversion, some specific parameters can be selectively amplified to enhance their characteristics. The processor 130 can be a microprocessor or a control circuit including a microprocessor or the like for receiving the sensing signal from the touch-sensing circuit 110 and defining a position corresponding to the touching action according to the sensing signal, and execute the corresponding procedure. In addition, the processor 130 further receives the digital signal corresponding to the circuit-load from the ESD protection circuit 120 to determine whether the circuit-load change is out of an allowable range. When the processor 130 determines that the circuit-load of the ESD protection circuit 120 is out of the allowable range, the processor outputs an alarm message to remind the user to repair the touch panel.

Figure 2:
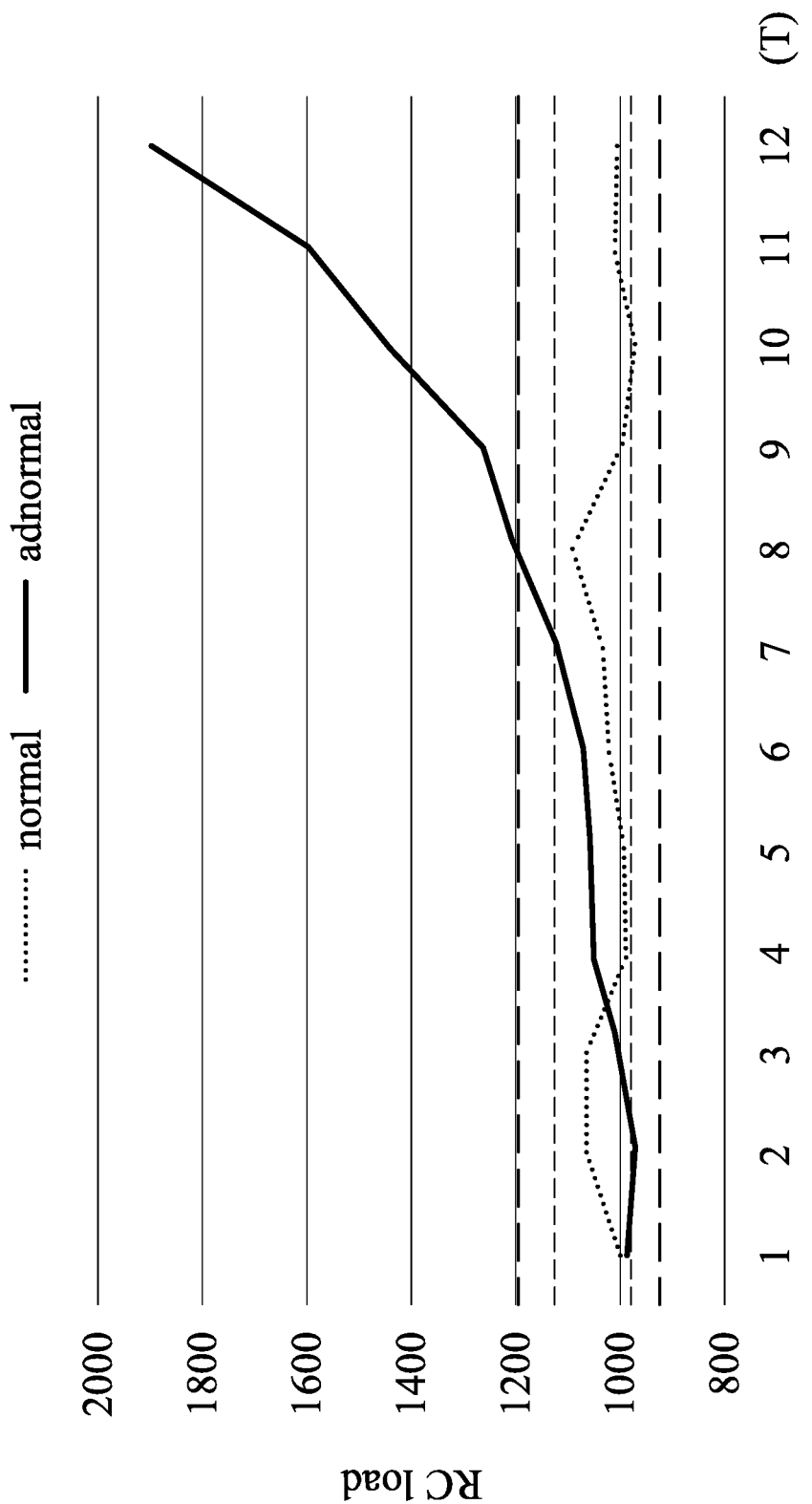
FIG. 2 is a schematic diagram of a circuit-load change in accordance with an embodiment of the present invention.

In general, under normal conditions, after a touch panel is produced, if there is no external interference, the circuit-load will be stable within a certain range, and it will only have a little disturbance due to environment changes, but it will not change substantially over time. FIG. 2 is a schematic diagram of circuit-load changes under normal conditions and abnormal conditions, in accordance with an embodiment of the present invention. In this embodiment, a normal range of values for the RC load should be between 1000 and 1100, and values 900 and 1200 are buffer values. For example, as shown in the figure, the curve of the RC load for a normal touch panel should be shown as curve 1, where the value should be changed to between 1000 and 1100. However, when the value of the RC load is changed as per curve 2, i.e. when the value of RC load rises above 1200 or its slope change is out of a predetermined value, it means that the touch panel may be defective or abnormal. In order to avoid the above situation, when the processor 130 determines that the value of the circuit-load output from the ESD protection circuit 120 is not located between 1000 and 1100 but still less than 1200 or is out of 900, the processor 130 outputs a first warning message to remind the user that the touch panel may be abnormal. When the processor 130 determines that the value of the circuit-load has exceeded 1200 or less than 900, which means that the touch panel may be a defective product or has failed, then the processor 130 outputs a second warning signal to remind the user to repair the touch panel. The normal range of the circuit-load value can be determined according to the value while the touch panel is being manufactured. Otherwise, since the environment of the factory might be different from the users' environment which may lead to misjudgments, the normal range of the circuit-load value can also be determined based on the default value when the user starts up the touch panel for the first time.

Figure 3:
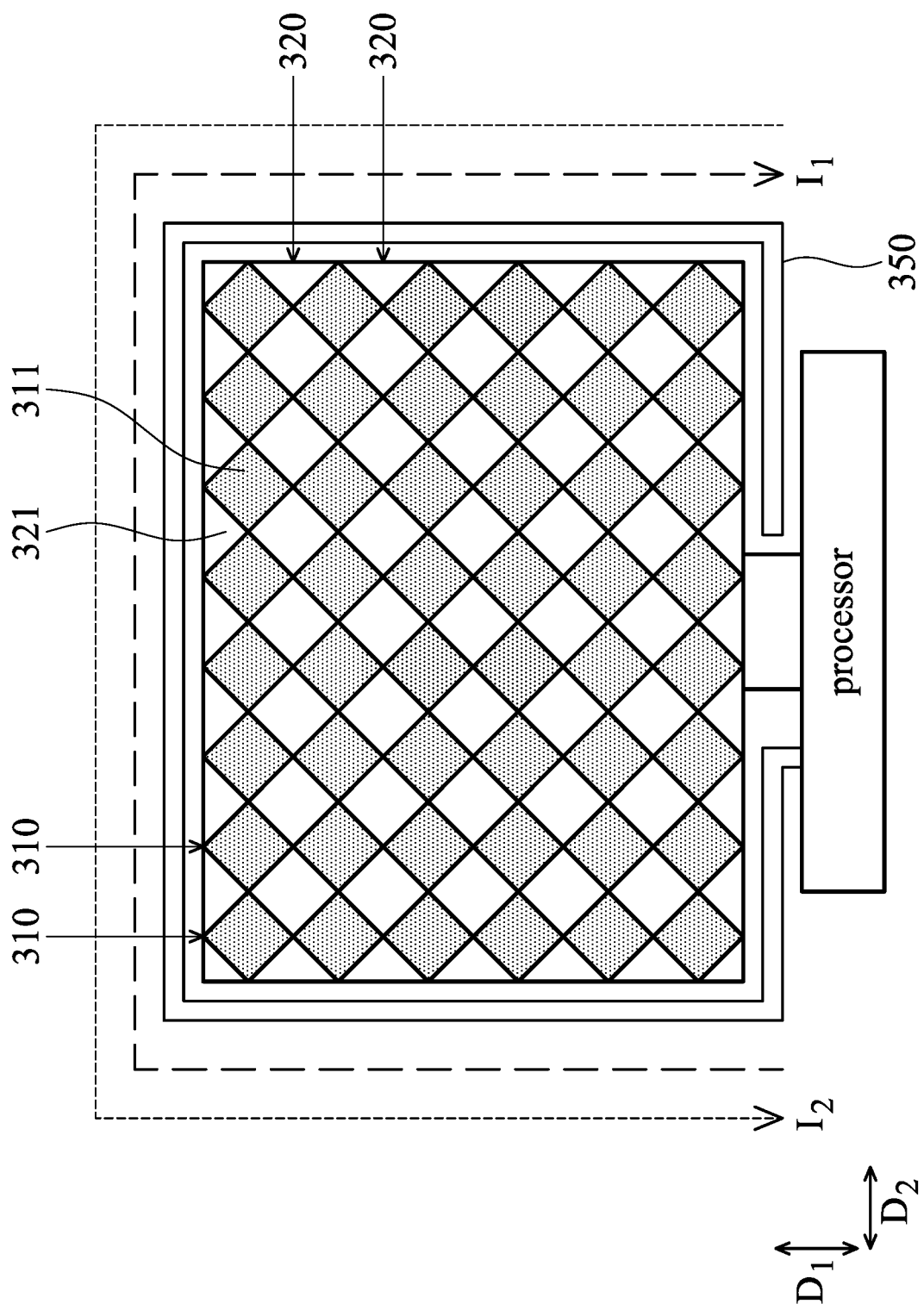
FIG. 3 is a schematic diagram of the touch panel in accordance with an embodiment of the present invention.

FIG. 3 is a schematic view of the touch panel in accordance with an embodiment of the present invention. As shown in FIG. 3, the touch-sensing circuit consists of a plurality of first sensing series 310 and a plurality of second sensing series 320. The first sensing series 310 is disposed along the first direction D1, and consists of a plurality of first sensing pads 311. The second sensing series 320 is disposed along the second direction D2, and consists of a plurality of second sensing pads 321. All of the first sensing series and the second sensing series are connected to the processor 130. In this embodiment, the ESD protection circuit consists of an ESD protection ring 350 having a single line. As shown in FIG. 3, the ESD protection ring 350 surrounds the touch-sensing circuit 110 and then goes back along the same path in the opposite direction. In this way, the direction of the inner conductor current I1 of the ESD protection ring is opposite the direction of the outer conductor current I2, so that the ESD protection ring will not generate a magnetic field, and the operation of the touch-sensing circuit 110 will not be disturbed.

Figure 4:
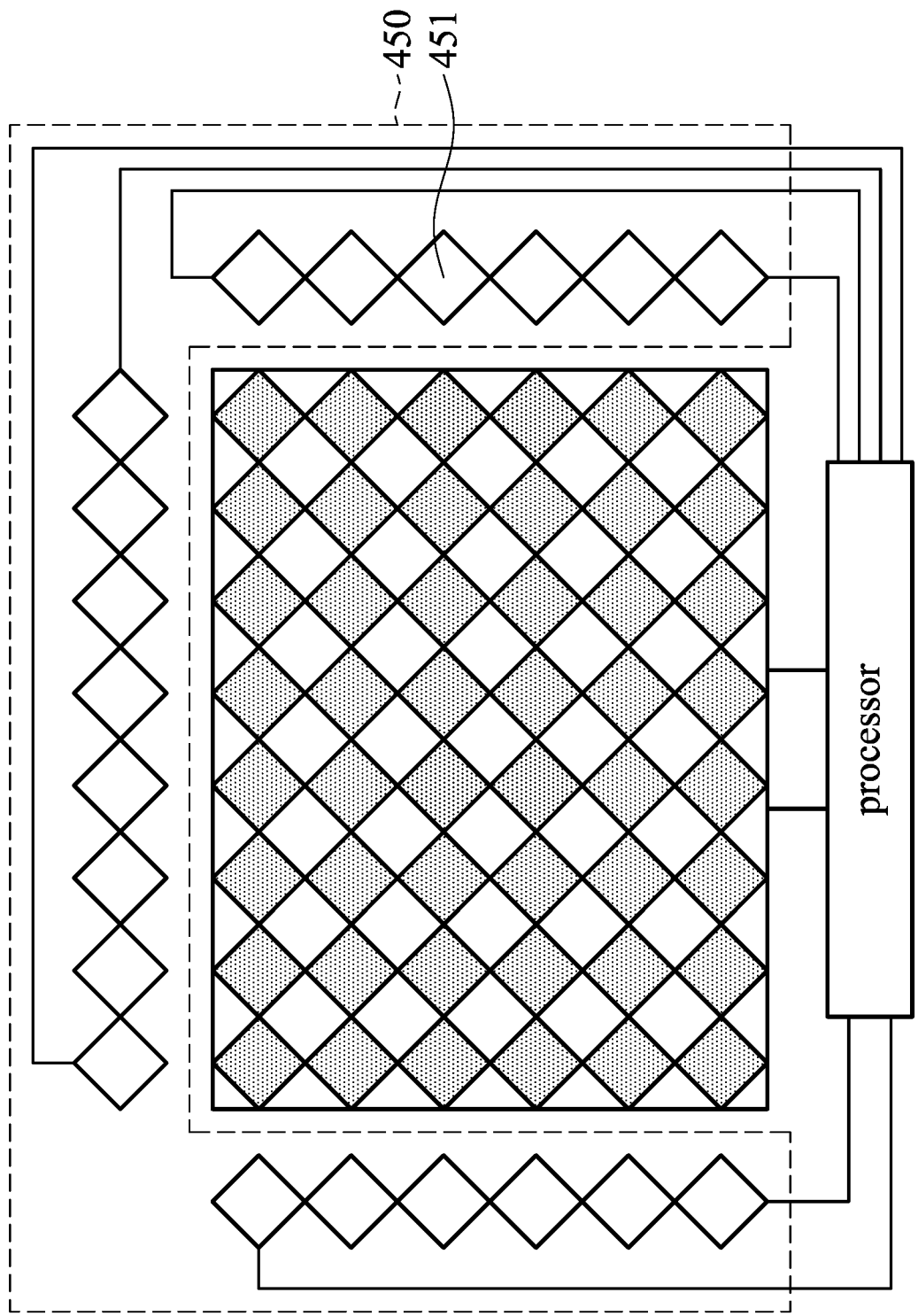
FIG. 4 is a schematic diagram of the touch panel in accordance with another embodiment of the present invention.

FIG. 4 is a schematic view of the touch panel in accordance with another embodiment of the present invention. The touch-sensing circuit shown in FIG. 4 is the same as the touch-sensing circuit shown in FIG. 3, thus it is not described herein to simplify the description. The ESD protection circuit 450 consists of a dummy pattern 451 having the same material as the sensing pads 311 and 322 and without any touch function, and it is driven by the same conditions so that the ESD protection circuit 450 has the same aging conditions as the sensing pads 311 and 322.

Figure 5:
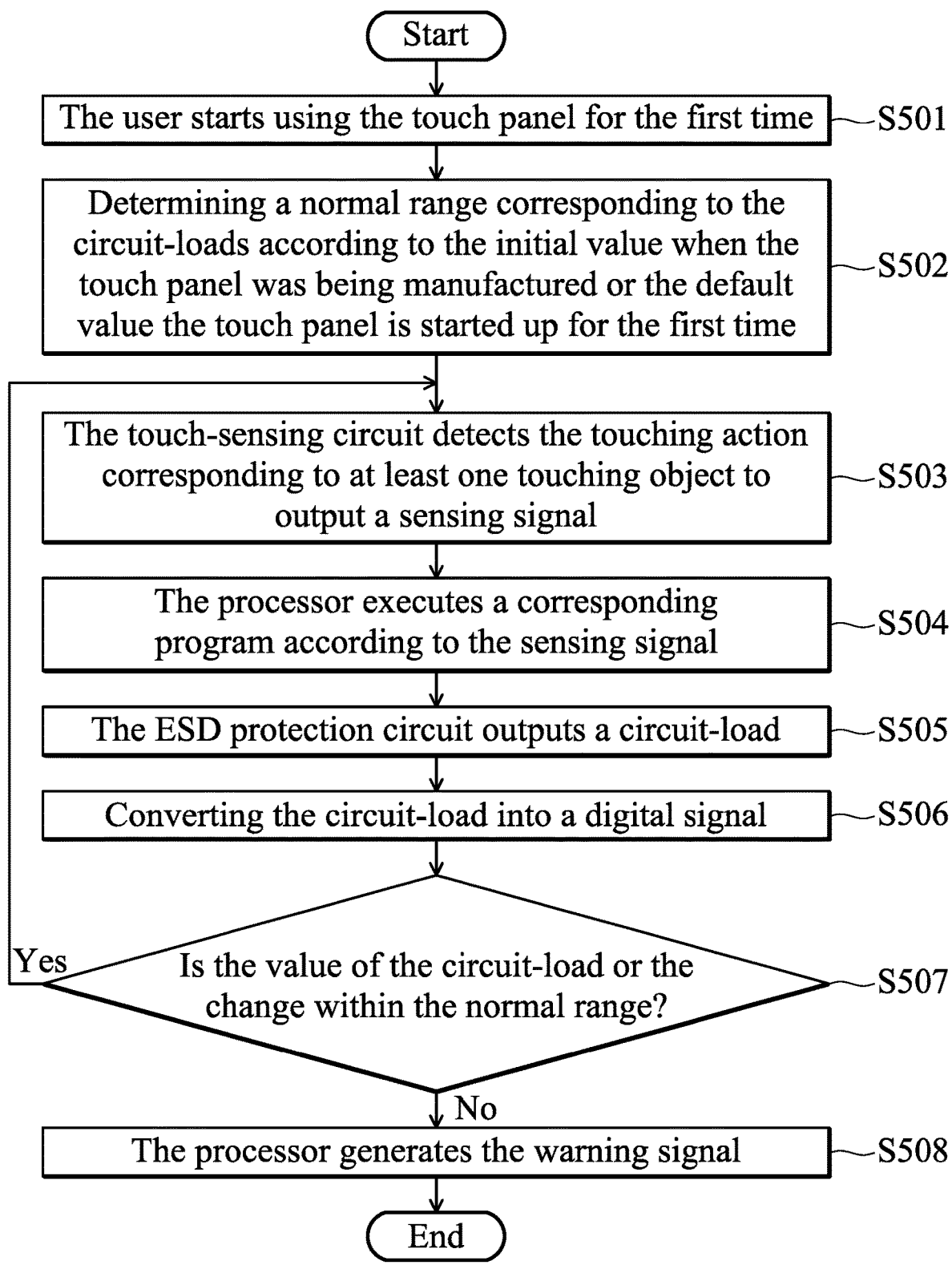
FIG. 5 is a flow chart of a method of examining a touch panel in accordance with some embodiments of the present invention.

FIG. 5 is a flow chart of the method of examining the touch panel in accordance with an embodiment of the present invention. The method starts at step S501, in which the user starts using the touch panel 100 for the first time. In step S502, the processor 130 determines a normal range corresponding to the circuit-loads according to the initial value when the touch panel was being manufactured or the default value when the user started up the touch panel for the first time. In step S503, the touch-sensing circuit 110 detects the touching action corresponding to at least one touching object to output a sensing signal. In step S504, the processor 130 performs a corresponding action according to the sensing signal. In step S505, the ESD protection circuit 120 outputs a circuit-load. In step S506, the circuit-load is converted into a digital signal via analog-to-digital conversion. In step S507, the processor 130 receives the digital signal corresponding to the circuit-load, and determines whether the value of the circuit-load or the change is within the normal range. When the processor 130 determines that the value or the change of the circuit-load is within the normal range, the method proceeds back to step S503, in which the touch-sensing circuit 110 continuously performs the operation of the touch-sensing action. Conversely, when the processor 130 determines that the value of the circuit-load or the change is out of the normal range, the method proceeds to step S508, and the processor 130 generates the warning signal.

As described above, according to the embodiments of the present invention, the processor of the touch panel can determine whether the function of the touch panel is abnormal by reading the circuit-load change of the ESD protection circuit having the same material as the touch-sensing circuit and without any touch function. In addition, in order to avoid a situation caused by the disconnection design of the ESD protection circuit wherein charges pass through the gap and destroy the touch-sensing circuit, an embodiment of the present invention is further provided with an ESD protection ring having an inner ring and an outer ring. Furthermore, for simulating the aging situation of the sensing pad, the present invention further provides an ESD protection circuit consisting of a plurality of dummy patterns having the same material as the sensing pads of the touch-sensing circuit to improve the accuracy of the determination.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A touch panel, comprising:
   a touch-sensing circuit, constituted by a plurality of sensing pads for sensing at least one touching object, outputting a sensing signal;
   an electrostatic discharge (ESD) protection circuit, connected to the touch-sensing circuit, surrounding the touch-sensing circuit and generating a circuit-load; and
   a processor, coupled to the touch-sensing circuit and the ESD protection circuit for receiving the sensing signal and the circuit-load, performing an action according to the sensing signal and determining whether to generate a warning signal according to a circuit-load change;
   wherein the ESD protection circuit consists of a line having a first segment and a second segment, the first segment and the second segment surround the touch-sensing circuit, but a current direction corresponding to the first segment is opposite to a current direction corresponding to the second segment, and a material of the touch-sensing circuit is the same as a material of the ESD protection circuit.

2. The touch panel as claimed in claim 1, wherein the circuit-load is a resistor-capacitor load or a resistance value, and the processor generates a warning signal when a circuit-load change is out of a predetermined range.

3. The touch panel as claimed in claim 2, wherein the predetermined range is defined based on an initial value while the touch panel is being manufactured or a default value when the touch panel is being started up for the first time.

4. The touch panel as claimed in claim 1, wherein the line of the ESD protection circuit consists of a plurality of sensing pads.

5. A method of examining touch panel, comprising:
sensing, using a touch-sensing circuit, at least one touching object to output a sensing signal, wherein the touch-sensing circuit consists of a plurality of sensing pads;
performing, using a processor, an action according to the sensing signal;
receiving, using the processor, a circuit-load of an electrostatic discharge (ESD) protection circuit, wherein the ESD protection circuit is connected to the touch-sensing circuit and surrounds the touch-sensing circuit; and
determining, using the processor, whether to generate a warning signal according to a circuit-load change;
wherein the ESD protection circuit consists of a line having a first segment and a second segment, the first segment and the second segment surround the touch-sensing circuit, but a current direction corresponding to the first segment is opposite to a current direction corresponding to the second segment, and a material of the touch-sensing circuit is the same as a material of the ESD protection circuit.

6. The method as claimed in claim 5, wherein the step of determining whether to generate a warning signal according to a circuit-load change further comprises:
determining, using the processor, whether a circuit-load change is out of a predetermined range;
wherein the processor generates the warning signal when a circuit-load change is out of a predetermined range; and
wherein the circuit-load is a resistor-capacitor load or a resistance value.

7. The method as claimed in claim 5, wherein the ESD protection circuit consists of a plurality of sensing pads.

8. The method as claimed in claim 5, wherein a predetermined range is defined based on an initial value while the touch panel is being manufactured or a default value when the touch panel is being started up for the first time.

* * * * *